United States Patent
Haran

(10) Patent No.: US 9,184,965 B1
(45) Date of Patent: Nov. 10, 2015

(54) ENERGY EFFICIENT HIGHWAY ADDRESSABLE REMOTE TRANSDUCER SOFT MODEM

(71) Applicant: Smart Embedded Systems Inc., Fremont, CA (US)

(72) Inventor: Pranatharthi Subbaratnam Haran, Fremont, CA (US)

(73) Assignee: Smart Embedded Systems, Inc., Fremont, CA (US)

( * ) Notice: Subject to any disclaimer, the term of this patent is extended or adjusted under 35 U.S.C. 154(b) by 0 days.

(21) Appl. No.: 14/791,481

(22) Filed: Jul. 6, 2015

Related U.S. Application Data

(62) Division of application No. 14/466,970, filed on Aug. 23, 2014, now Pat. No. 9,106,488.

(51) Int. Cl.
- *H04B 1/38* (2015.01)
- *H04L 5/16* (2006.01)
- *H04L 27/227* (2006.01)
- *H04B 3/04* (2006.01)
- *H04L 7/00* (2006.01)

(52) U.S. Cl.
CPC .............. *H04L 27/2275* (2013.01); *H04B 3/04* (2013.01); *H04L 7/0087* (2013.01)

(58) Field of Classification Search
CPC ..... H04L 27/2275; H04L 7/0087; H04B 3/04
See application file for complete search history.

(56) References Cited

U.S. PATENT DOCUMENTS

| | | | | |
|---|---|---|---|---|
| 5,596,188 | A * | 1/1997 | McElroy | 250/231.16 |
| 6,297,691 | B1 * | 10/2001 | Anderson et al. | 329/300 |
| 8,204,078 | B2 * | 6/2012 | McLaughlin | 370/466 |
| 2002/0150156 | A1 * | 10/2002 | Calvin | 375/238 |
| 2004/0113814 | A1 * | 6/2004 | Lochner | 340/870.18 |
| 2009/0072994 | A1 * | 3/2009 | Kleven et al. | 340/870.05 |
| 2009/0110039 | A1 * | 4/2009 | Kort | 375/222 |
| 2011/0286542 | A1 * | 11/2011 | Shelburne | 375/272 |
| 2012/0020430 | A1 * | 1/2012 | Haase et al. | 375/295 |
| 2013/0107919 | A1 * | 5/2013 | Burns et al. | 375/219 |
| 2014/0269764 | A1 * | 9/2014 | Borgeson et al. | 370/468 |

* cited by examiner

*Primary Examiner* — Erin File
(74) *Attorney, Agent, or Firm* — Ash Tankha; Lipton, Weinberger & Husick

(57) ABSTRACT

A method and a highway addressable remote transducer (HART) soft modem device for modulating and demodulating analog signals with HART messages are provided. A phase coherent frequency shift keying (FSK) modulator modulates and transmits analog signals with HART messages, and a phase coherent FSK demodulator receives and demodulates the analog signals with the HART messages. The FSK modulator is a digital modulator that outputs 1 or 0 for transmission. With oversampling and low pass filtering, the digital modulation results in low jitter and good signal to noise ratio. The FSK demodulator applies a fast energy detect algorithm and dynamically reduces or increases a clock speed of a central processing unit (CPU) of the HART soft modem device for reducing power consumption of the CPU. Furthermore, the HART soft modem device uses direct memory access (DMA) to further reduce the power consumption, thereby reducing the overall power consumption by around 50%.

5 Claims, 10 Drawing Sheets

ENERGY EFFICIENT HIGHWAY ADDRESSABLE REMOTE TRANSDUCER SOFT MODEM

CROSS REFERENCE TO RELATED APPLICATIONS

This application is a divisional application of non-provisional patent application Ser. No. 14/466,970, titled "Energy Efficient Highway Addressable Remote Transducer Soft Modem", filed on Aug. 23, 2014 in the United States Patent and Trademark Office.

BACKGROUND

Smart field data devices in use today are generally Highway Addressable Remote Transducer (HART) enabled. HART is a global standard for sending and receiving digital information across analog wires between smart devices and control or monitoring systems. The HART communications protocol is widely recognized as the industry standard for digitally enhanced 4 milliampere (mA)-20 mA smart instrument communication. Use of the HART based technology is growing rapidly and today most major global instrumentation suppliers offer products with the HART communications protocol. The HART communications protocol enables two-way digital communication with smart instruments without disturbing 4 mA-20 mA analog signals. The HART communications protocol utilizes, for example, the Bell 202 frequency shift keying (FSK) standard of the Bell 202 modulator-demodulator (modem) of Bell System to superimpose digital communication signals at a low level over the 4 mA-20 mA analog signals. This process enables two-way field communication and makes it possible for additional information beyond the typical process variables to be communicated to and from a smart field instrument.

Current deployment of Highway Addressable Remote Transducer (HART) field data devices utilizes a hardware based Bell 202 modem and a separate microcontroller for a HART communications protocol implementation which adds to the total power. One or more HART field data device implementations, for example, a mixed signal microcontroller such as the MSP430 microcontroller, that utilize low power are known in the art. The MSP430 microcontroller utilizes many power saving techniques comprising multiple low power modes (LPMs), for example, LPM1 to LPM3. The current state of the art HART field data device implementations utilize these power saving methods. Although the MSP430 microcontroller can perform direct memory access (DMA) when a central processing unit (CPU) of the MSP430 microcontroller is not on or activated, the HART field data devices that currently exist do not implement this technique. Moreover, the implementations known in the art utilize a poor approximation of the Bell 202 modem and are likely to result in poor performance characteristics in terms of bit error rate and low probability of receiving HART communications protocol messages correctly. Furthermore, combining precise digital signal processing (DSP) algorithms with DMA power saving methods are not implemented in the HART field data devices known in the art.

Highway Addressable Remote Transducer (HART) field data devices are commonly used in industrial automation and control systems. Many of these HART field data devices comprise a microcontroller, a HART modulator-demodulator (modem) compliant to the Bell 202 standard, and an interface arrangement compliant to a conventional 4 mA-20 mA current loop circuit. However, the total component count of the HART modem adds to the overall cost, lowers reliability of the HART modem, and results in higher power consumption. Hence, there is a need for a solution, for example, a soft modem device which eliminates additional components such as modem chips, resistors, capacitors, crystal oscillators, etc., and reduces cost and power. Since the HART communications protocol typically requires less than 1 megahertz (MHz) of central processing unit (CPU) cycles, the HART field data devices allow room for soft modem implementation. A soft modem is a modem with minimal hardware that utilizes a host's resources in place of additional hardware in a conventional modem. Since HART field data devices that utilize Bell 202 modem standards are power sensitive, there is a need for a soft modem implementation of the HART field data device that uses advanced techniques to minimize operating power.

In a typical Highway Addressable Remote Transducer (HART) field data device, modulation is performed via pulse width modulation (PWM). PWM is a modulation technique that controls the width of a pulse based on modulator signal information. Typically, PWM allows control of the power supplied to electrical devices. A conventional PWM modulator utilizes two different frequencies for PWM generation. This type of modulation works well at low baud rates, for example, at 300 bauds in a V.21 or Bell 103 modem, but results in substantial jitter and a lack of phase coherency at higher speeds. Hence, there is a need for a digital modulator with an exact numerical implementation, that outputs 1 or 0 instead of an 8 bit value, that operates at high baud rates, for example 19200 or 9600 samples per second, and that results in low jitter and a good signal to noise ratio. Further, there is a need for lowering power consumption of the HART field data device by incorporating energy detect schemes to reduce the central processing unit (CPU) speed when no HART analog signal is present, using direct memory access which can work without CPU intervention, thereby lowering CPU power consumption, and changing the CPU clock dynamically as the processing demand of the HART field data device increases. Common energy detection methods for detecting a valid signal to enable power savings in a soft modem utilize an averaging and threshold detection method. These energy detection methods, typically, have a longer time constant and are slow to respond. Hence, there is a need for a quick energy detection method with a slower detection of energy decay.

Hence, there is a long felt but unresolved need for a soft modem implementation of a Highway Addressable Remote Transducer (HART) field data device which requires low operating power. Furthermore, there is a need for a method that performs quick energy detection of digitized analog samples and throttling of the central processing unit (CPU) clock of the HART soft modem device based on the energy detection of the digitized analog samples, for reducing power consumption of the HART soft modem device.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the Highway Addressable Remote Transducer (HART) soft modem device disclosed herein address the above stated needs for a soft modem implementation of a HART field data device which requires low operating power, and performs quick energy detection of the digitized analog samples and throttling of a central processing unit (CPU)

clock of the HART soft modem device based on the energy detection of the digitized analog samples, for reducing power consumption of the HART soft modem device.

The method and the Highway Addressable Remote Transducer (HART) soft modem device disclosed herein modulates and transmits an output analog signal comprising a HART message. The HART soft modem device comprises a parallel to serial converter which implements a process that converts the HART message into a serial data bit stream comprising binary information. The HART soft modem device further comprises a phase coherent frequency shift keying (FSK) modulator that checks a value of the binary information of the serial data bit stream. The phase coherent FSK modulator is hereinafter referred to as an "FSK modulator". The FSK modulator sets a phase change of a carrier signal to a first frequency, for example, 1200 hertz (Hz), when the value of the binary information is 1. The FSK modulator sets the phase change of the carrier signal to a second frequency, for example, 2200 Hz, when the value of the binary information is 0. The FSK modulator accumulates incremental phase change data by continuously adding the phase changes of the carrier signal. The FSK modulator compares the accumulated phase change data with multiple sine values from a predetermined sine value phase table. The FSK modulator selects a sine value corresponding to the accumulated phase change data from the predetermined sine value phase table. The FSK modulator converts the selected sine value into an analog signal for transmission of the HART message.

Also, disclosed herein is a method for receiving and demodulating an analog signal comprising a Highway Addressable Remote Transducer (HART) message. The HART soft modem device disclosed herein further comprises a phase coherent frequency shift keying (FSK) demodulator that receives the analog signal comprising the HART message. The phase coherent FSK demodulator is hereinafter referred to as an "FSK demodulator". The FSK demodulator samples the analog signal and converts the sampled analog signal into digitized analog samples at a predetermined digital sampling rate. The FSK demodulator processes the digitized analog samples for removing low frequency interfering signals from the digitized analog samples. The FSK demodulator compares signal amplitude of the processed digitized analog samples with predetermined threshold values and applies a fast energy detect algorithm using an energy detector for determining whether further signal processing of the processed digitized analog samples is required. The FSK demodulator reduces the clock speed of the central processing unit (CPU) of the HART soft modem device to a predetermined low frequency value, for example, 1 MHz, when sufficient energy is not detected in the processed digitized analog samples during the comparison.

The frequency shift keying (FSK) demodulator increases the clock speed of the CPU of the Highway Addressable Remote Transducer (HART) soft modem device to a predetermined high frequency value, for example, 4 MHz, when sufficient energy is detected in the processed digitized analog samples during the comparison. The FSK demodulator introduces a predetermined phase delay in the processed digitized analog samples for producing phase shifted digitized analog samples. The FSK demodulator demodulates the processed digitized analog samples to obtain a demodulated analog signal via phase discrimination by multiplying the processed digitized analog samples from the energy detector with the phase shifted digitized analog samples. The FSK demodulator removes second order frequencies in the demodulated digitized analog samples. The FSK demodulator checks the demodulated digitized analog samples for a binary value. A positive demodulated digitized analog sample represents a 1 and a negative demodulated digitized analog sample represents a 0. The FSK demodulator performs a bit shift operation and assembles an 11 bit character for character generation and bit synchronization of the demodulated analog signal.

Also, disclosed herein is a method for performing energy detection and determining a speed of the central processing unit (CPU) clock of the Highway Addressable Remote Transducer (HART) soft modem device. The frequency shift keying (FSK) demodulator of the HART soft modem device comprises a high pass filter and an energy detector. The energy detector receives digitized analog samples from the high pass filter. The energy detector compares the signal amplitude of the received digitized analog samples with predetermined threshold values. The energy detector detects presence of a valid HART analog signal when the comparison results in a value greater than the predetermined threshold values, that is, a predetermined upper threshold value and a predetermined lower threshold value. When a valid HART analog signal is detected, the energy detector increases the speed of the CPU clock of the HART soft modem device to a predetermined high frequency value. The energy detector sets an energy detect count value to a predetermined value and decrements the energy detect count value when the signal amplitude of the received digitized analog samples is less than the predetermined threshold values. The energy detector detects absence of the valid HART analog signal when the energy detect count value is less than zero and reduces the speed of the CPU clock of the HART soft modem device to a predetermined low frequency value for reducing power consumption of the CPU.

In one or more various aspects, related systems include but are not limited to circuitry and/or programming for effecting the methods referenced herein; the circuitry and/or programming can be virtually any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1:
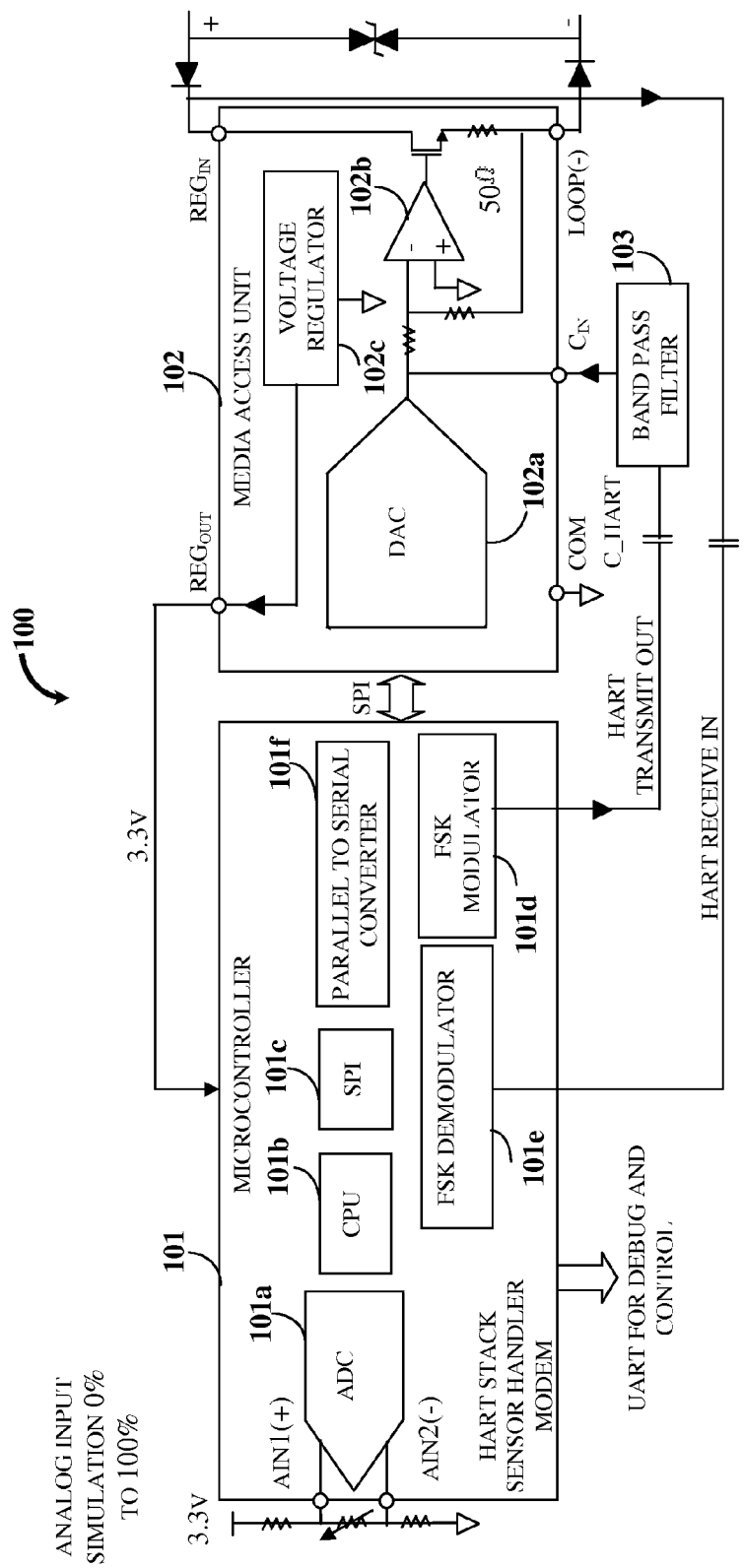
FIG. 1 exemplarily illustrates a block diagram of a Highway Addressable Remote Transducer soft modem device.

FIG. 1 exemplarily illustrates a block diagram of a Highway Addressable Remote Transducer (HART) soft modem device 100. As used herein, "HART soft modem device" refers to a software modem that incorporates the HART communications protocol. The HART communications protocol is one of the leading communication protocols used worldwide in industrial applications, with the majority of smart field data devices and intelligent process measurement and control systems utilizing this communication technology. The HART soft modem device 100 disclosed herein combines modulator-demodulator (modem) and microcontroller technologies in a single device. In the HART soft modem device 100 disclosed herein, soft modem technology is utilized in the processor or microcontroller 101 that is used for performing HART communications protocol control. The HART soft modem device 100 disclosed herein is a low power HART soft modem device.

The Highway Addressable Remote Transducer (HART) soft modem device 100 disclosed herein comprises a microcontroller 101, a media access unit 102, and a band pass filter 103. The microcontroller 101 performs input and/or output operations and control functions of the HART soft modem device 100. The microcontroller 101 comprises an analog to digital converter (ADC) 101a, a central processing unit (CPU) 101b, a serial peripheral interface (SPI) 101c, a parallel to serial converter 101f, a phase coherent frequency shift keying (FSK) modulator 101d, and a phase coherent FSK demodulator 101e. The phase coherent FSK modulator 101d is hereinafter referred to as an "FSK modulator". The phase coherent FSK demodulator 101e is hereinafter referred to as an "FSK demodulator". The analog to digital converter 101a converts analog signals comprising a HART message into a digital format or digitized analog samples by sampling and digitizing the analog signals. The CPU 101b is communicatively coupled to the analog to digital converter 101a. The CPU 101b converts baseboard communication data packets into HART messages or SPI packets. The SPI 101c provides a communication interface between the microcontroller 101 and the media access unit 102.

The parallel to serial converter 101f converts the highway addressable remote transducer (HART) message into a serial data bit stream comprising binary information. The frequency shift keying (FSK) modulator 101d is communicatively coupled to the central processing unit (CPU) 101b. The FSK modulator 101d modulates the serial data bit stream resulting from serialization of the HART messages and transmits the modulated HART analog signal. In an embodiment, the FSK modulator 101d is a fully digital modulator with an exact numerical implementation and outputs a binary value, for example, 1 or 0 similar to a 1 bit digital to analog converter instead of outputting an 8 bit value. With over sampling at about 19200 samples per second or about 9600 samples per second and with further low pass filtering, the digital modulation results in low jitter and good signal to noise ratio. In an embodiment, the output can also be generated through a pulse width modulation (PWM) based digital to analog converter (not shown) which provides more precision. The FSK demodulator 101e facilitates receipt of an FSK modulated HART analog signal for demodulation. The FSK demodulator 101e is communicatively coupled to the CPU 101b.

The media access unit 102 is communicatively coupled to the microcontroller 101. The media access unit 102 operably connects the microcontroller 101 to a 4 mA-20 mA current loop circuit as exemplarily illustrated in FIG. 1. As used herein, "media access unit" refers to an electronic device that connects multiple network stations in a predefined topology, for example, a star topology, and is internally wired to connect the network stations into a logical ring. The media access unit 102 comprises a digital to analog converter (DAC) 102a, an amplifier 102b, and a voltage regulator 102c. The digital to analog converter 102a converts the digitized current setting from the microcontroller 101 into an analog loop current. The amplifier 102b is operably coupled to the digital to analog converter 102a. The amplifier 102b amplifies the analog loop current received from the digital to analog converter 102a. The modulated Highway Addressable Remote Transducer (HART) analog signal is also summed at the amplifier 102b from the entry point Cin as exemplarily illustrated in FIG. 1. The voltage regulator 102c is operably coupled to the digital to analog converter 102a. The voltage regulator 102c regulates and maintains the voltage level of the HART soft modem device 100 at a constant level. The band pass filter 103 is operably coupled to the microcontroller 101 and the media access unit 102. The band pass filter 103 filters any out of band noise in the modulated HART analog signal.

The Highway Addressable Remote Transducer (HART) soft modem device 100 implements several techniques for lowering power consumption of the HART soft modem device 100. The HART soft modem device 100 incorporates energy detection, for example, by throttling the speed of the central processing unit (CPU) 101b of the HART soft modem device 100, when no HART analog signal is detected, and by using a direct memory access (DMA) controller 1000 exemplarily illustrated in FIG. 10, which can work without CPU intervention, thereby lowering power consumption of the CPU 101b. Since the CPU 101b is one of the biggest power consuming parts of the microcontroller 101, reducing utilization of the CPU 101b for modulation and demodulation operations can reduce the total power consumption of the HART soft modem device 100. The HART soft modem device 100 changes the speed of the CPU clock dynamically as the processing demand of the HART soft modem device 100 increases. The methods disclosed herein lower power consumption by more than about 50%.

Figure 2:
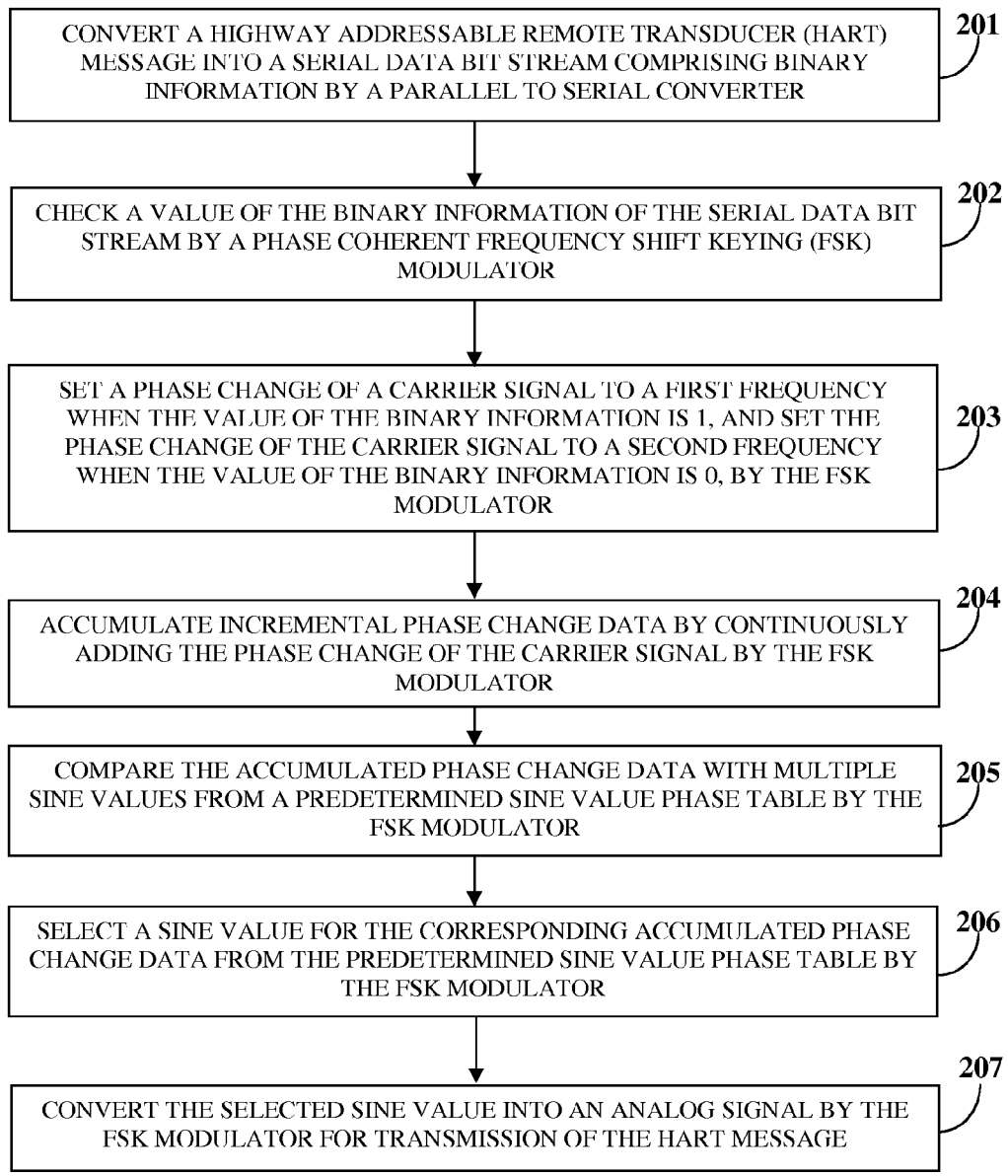
FIG. 2 illustrates a method for modulating and transmitting an analog signal comprising a Highway Addressable Remote Transducer message.

FIG. 2 illustrates a method for modulating and transmitting an analog signal comprising a Highway Addressable Remote Transducer (HART) message. The parallel to serial converter 101f of the HART soft modem device 100 exemplarily illustrated in FIG. 1, converts 201 the HART message into a serial data bit stream comprising binary information. The frequency shift keying (FSK) modulator 101d of the HART soft modem device 100 exemplarily illustrated in FIG. 1, checks 202 a value of the binary information of the serial data bit stream.

The FSK modulator 101d sets 203 a phase change of a carrier signal to a first frequency when the value of the binary information is 1. The first frequency is, for example, 1200 hertz (Hz) and the phase change is about 45 degrees at a sampling rate of about 9600 Hz. The FSK modulator 101d sets 203 a phase change of the carrier signal to a second frequency when the value of the binary information is 0. The second frequency is, for example, 2200 Hz and the phase change is about 82.5 degrees at a sampling rate of about 9600 Hz. The FSK modulator 101d accumulates 204 incremental phase change data by continuously adding the phase changes of the carrier signal. The FSK modulator 101d compares 205 the accumulated phase change data with multiple sine values from a predetermined sine value phase table shown in Table 1 below. The FSK modulator 101d selects 206 a sine value for the corresponding accumulated phase change data from the predetermined sine value phase table. The FSK modulator 101d converts 207 the selected sine value into an analog signal for transmission of the HART message. This output process can be done with either a 1 to n bit digital to analog converter (DAC) or pulse width modulation (PWM) based DAC with n bit precision, where n can be any integer value more than 1.

Figure 3:
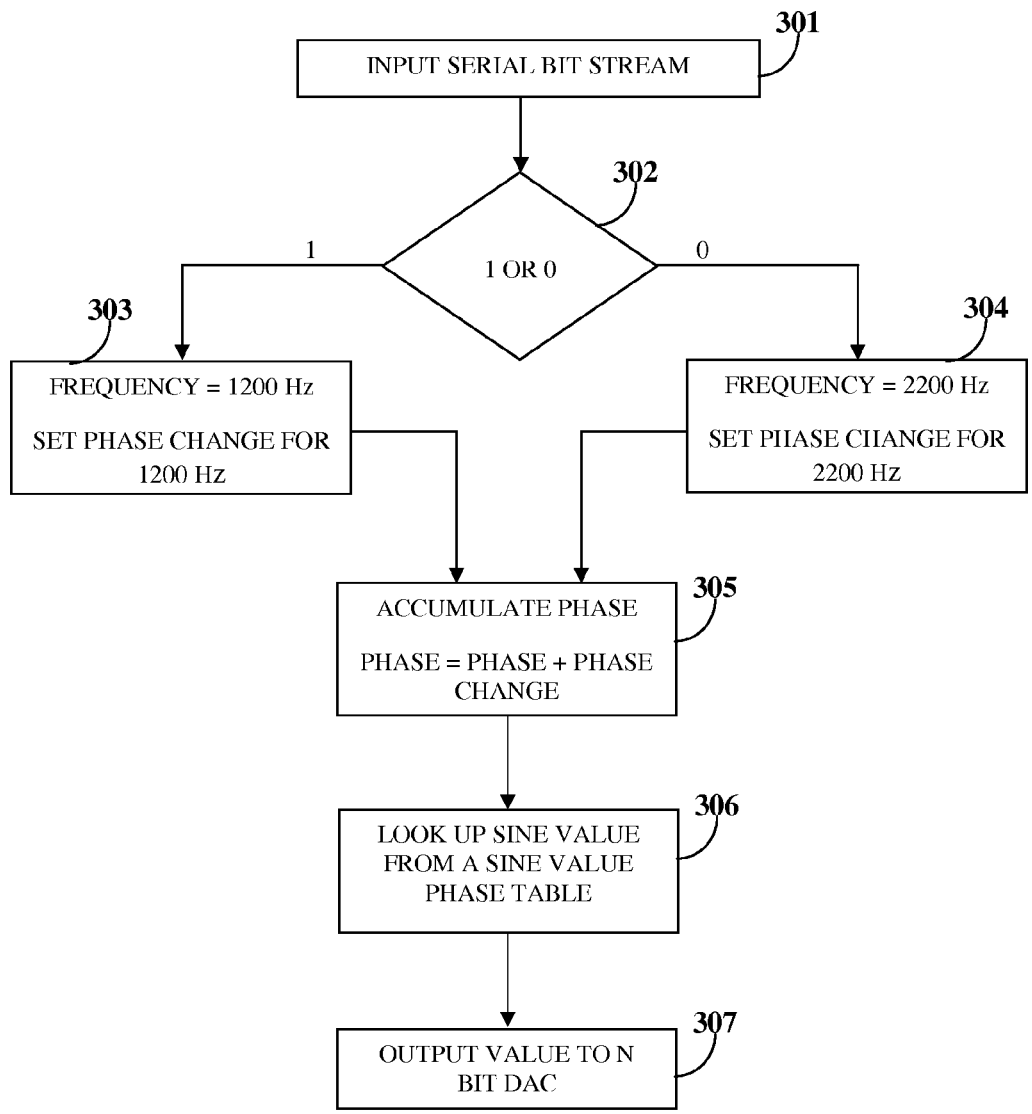
FIG. 3 illustrates a process flow diagram comprising the steps for modulating and transmitting an analog signal comprising a Highway Addressable Remote Transducer message.

Table 1: Sine value phase table:
sintable[256]={
0,3,6,9,12,15,18,21,24,28,31,34,37,40,43,46, \
48,51,54,57,60,63,65,68,71,73,76,78,81,83,85,88,\
90,92,94,96,98,100,102,104,106,108,109,111,112,114, 115,117,\
118,119,120,121,122,123,124,124,125,126,126,127, 127,127,127,127,\
127,127,127,127,127,127,126,126,125,124,124,123, 122,121,120,119,\
118,117,115,114,112,111,109,108,106,104,102,100, 98,96,94,92,\
90,88,85,83,81,78,76,73,71,68,65,63,60,57,54,51,\
48,46,43,40,37,34,31,28,24,21,18,15,12,9,6,3,\
0,−3,−6,−9,−12,−15,−18,−21,−24,−28,−31,−34, −37,−40,−43,−46,\
−48,−51,−54,−57,−60,−63,−65,−68,−71,−73,−76,−78, −81,−83,−85,−88,\
−90,−92,−94,−96,−98,−100,−102,−104,−106,−108, −109,−111,−112,−114,−115,−117,\
−118,−119,−120,−121,−122,−123,−124,−124,−125, −126,−126,−127,−127,−127,−127,−127,\
−127,−127,−127,−127,−127,−127,−126,−126,−125, −124,−124,−123,−122,−121,−120,−119,\
−118,−117,−115,−114,−112,−111,−109,−108,−106, −104,−102,−100,−98,−96,−94,−92,\
−90,−88,−85,−83,−81,−78,−76,−73,−71,−68,−65,−63, −60,−57,−54,−51,\
−48,−46,−43,−40,−37,−34,−31,−28,−24,−21,−18,−15, −12,−9,−6,−3
};

FIG. 3 illustrates a process flow diagram comprising the steps for modulating and transmitting an analog signal comprising a Highway Addressable Remote Transducer (HART) message. The frequency shift keying (FSK) modulator 101d of the HART soft modem device 100 exemplarily illustrated in FIG. 1 modulates and transmits analog signals comprising HART communications protocol messages. The parallel to serial converter 101f exemplarily illustrated in FIG. 1, converts the HART communications protocol messages into a serial bit stream 301 comprising binary information of 1 or 0. The FSK modulator 101d checks 302 every bit of the serial bit stream 301 for a 1 bit value or a 0 bit value. If the bit value is 1, then the FSK modulator 101d transmits or sends 303 a 1200 Hz carrier signal indicating a binary 1 as a transmitted bit and sets a phase change for 1200 Hz. If the bit value is 0, the FSK modulator 101d transmits or sends 304 a 2200 Hz carrier signal to indicate a binary 0 and sets a phase change for 2200 Hz.

The transmission of the 1200 Hz carrier signal or the 2200 Hz carrier signal is arrived at by accumulating 305 the incremental phase change representing the 1200 Hz or the 2200 Hz carrier signal and continuously summing the phase changes and performing a modulus of the accumulated phase with 360 representing 360 degrees in one full cycle of a sine wave. Further, in a digital implementation, the 360 degrees can be mapped to a convenient number by using the formula: 2 to the power of n, where n is an integer 1, 2, . . . , etc. The modulus operation can thus be simplified to a logic operation and can be effective in low power central processing unit (CPU) implementations. The result of the accumulated phase can be used to lookup 306 sine wave values in the sine value phase table, for example, Table 1 disclosed above which comprises pre-calculated values of the sine function. The result of the modulus operation is then outputted 307 to an n-bit digital to analog converter (DAC) 102a exemplarily illustrated in FIG. 1, or an n-bit pulse width modulation (PWM) based DAC.

The frequency shift keying (FSK) modulator 101d in the Highway Addressable Remote Transducer (HART) soft modem device 100 sends one of two different sine waves at 1200 Hz or 2200 Hz for a 1 or a 0 respectively. Further, when there is a change from 0 to 1 or from 1 to 0, the frequency also changes in a phase coherent manner, that is, there is no discontinuity in the phase of the transmitted signal. In the HART soft modem device 100 disclosed herein, the transmitted signal is outputted once every sample period, for example, either about 19200 Hz or about 9600 Hz or any other frequency depending on a specific implementation with the requirement that the frequency of the transmitted signal has to be 4 times more than the carrier frequency. In the case of the Bell 202 modem used in the HART soft modem device 100, the minimum sampling frequency is about 8800 Hz. The phase shift of the sine wave in one sample period can be calculated as: phase change=(2200 Hz or 1200 Hz/9600) times 360 degrees.

The phase change value is the amount of phase change which occurs from one sample to the next. The phase change value is accumulated and rolled over every 360 degrees, representing one full cycle of the sine wave. For the digital implementation suitable for the microcontroller 101 exemplarily illustrated in FIG. 1, a sine value phase table comprising 256 entries with sine values from 0 to 360 degrees divided equally 256 times is incorporated herein. Each entry in the sine value phase table is 360/256 degrees apart. A table lookup is performed in this sine value phase table for the currently accumulated phase of the modulated sine wave and a value is read. If the sine value is greater than 0, a 1 is outputted and for a value less than 0, a 0 is outputted. This digital output is similar to a 1 bit digital to analog converter (DAC). The digital output is further low pass filtered and transmitted as the Highway Addressable Remote Transducer (HART) analog signal. The sample frequency can be increased to about 19200 Hz or higher depending upon the noise measured in the final output. In an embodiment, if more precision is required, a pulse width modulation (PWM) based DAC can also be used for the output. This implementation results in a phase coherent frequency shift keying transmit signal.

Figure 4:
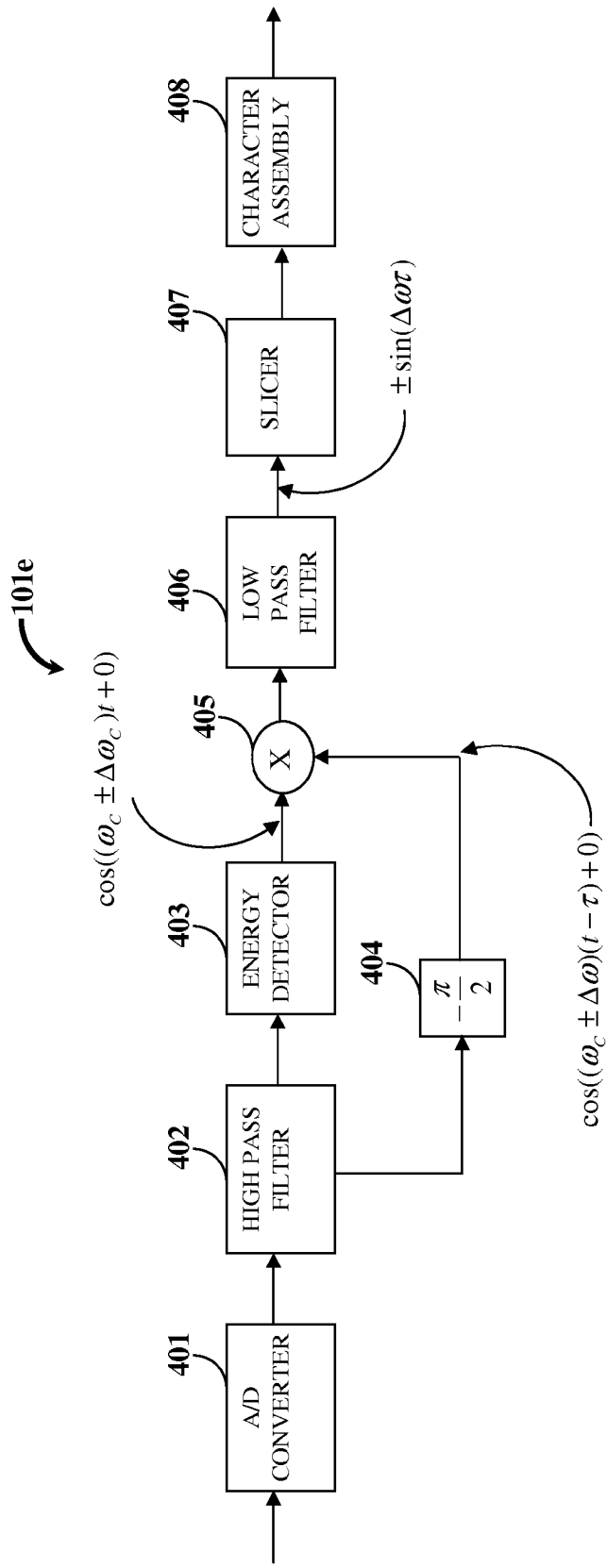
FIG. 4 exemplarily illustrates a block diagram of a phase coherent frequency shift keying demodulator of the Highway Addressable Remote Transducer soft modem device.

FIG. 4 exemplarily illustrates a block diagram of a phase coherent frequency shift keying (FSK) demodulator 101e of the Highway Addressable Remote Transducer (HART) soft modem device 100 exemplarily illustrated in FIG. 1. The FSK demodulator 101e comprises an analog to digital (A/D) converter 401, a high pass filter 402, an energy detector 403, a phase delay unit 404, a multiplier 405, a low pass filter 406, a decision maker or data slicer 407, and a character assembly unit 408. The A/D converter 401 samples the incoming analog signals and converts the analog signals into numbers or digitized analog samples for signal processing. The high pass filter 402 is operably coupled to the A/D converter 401. The high pass filter 402 removes any out of band noise signals arising due to current loop signaling from the digitized analog samples. The energy detector 403 is operably coupled to the high pass filter 402. The energy detector 403 implements an up down counting algorithm for determining when further processing of the digitized analog samples is required. The energy detector 403 further reduces power consumption of the HART soft modem device 100 by incorporating an energy detection method which throttles the master clock speed of the central processing unit (CPU) 101b of the microcontroller 101 exemplarily illustrated in FIG. 1, when no HART analog signal is present. The energy detector 403 also dynamically changes a clock of the CPU 101b of the microcontroller 101 as the processing demand of the HART soft modem device 100 increases.

The phase delay unit 404 is operably coupled to the high pass filter 402. The phase delay unit 404 introduces a predetermined phase delay, for example, a phase delay of $\pi/2$ in the digitized analog samples. The multiplier 405 is operably coupled to the energy detector 403 and the phase delay unit 404. The multiplier 405 multiplies the digitized analog samples from the energy detector 403 with the phase shifted digitized analog samples from the phase delay unit 404. The low pass filter 406 is operably coupled to the multiplier 405. The low pass filter 406 suppresses unwanted frequency components or noise signals in the digitized analog samples. The low pass filter 406 attenuates the digitized analog samples and removes short term fluctuations in the digitized analog samples. The data slicer 407 is operably coupled to the low pass filter 406. The data slicer 407 dynamically determines the optimum slicing point, that is, the optimum magnitude from the digitized analog samples with which to delineate between a binary 1 and 0 in the digitized analog samples. The data slicer 407 determines whether the frequency of the digitized analog samples exceeds a predetermined decision point value. The decision point value is selected between the frequency values representing "0", that is, 2200 Hz, and "1", that is, 1200 Hz. The character assembly unit 408 is operably coupled to the data slicer 407. The character assembly unit 408 performs character generation and bit synchronization of the digitized analog samples. The resulting byte stream is used for further Highway Addressable Remote Transducer (HART) protocol handling.

Figure 5:
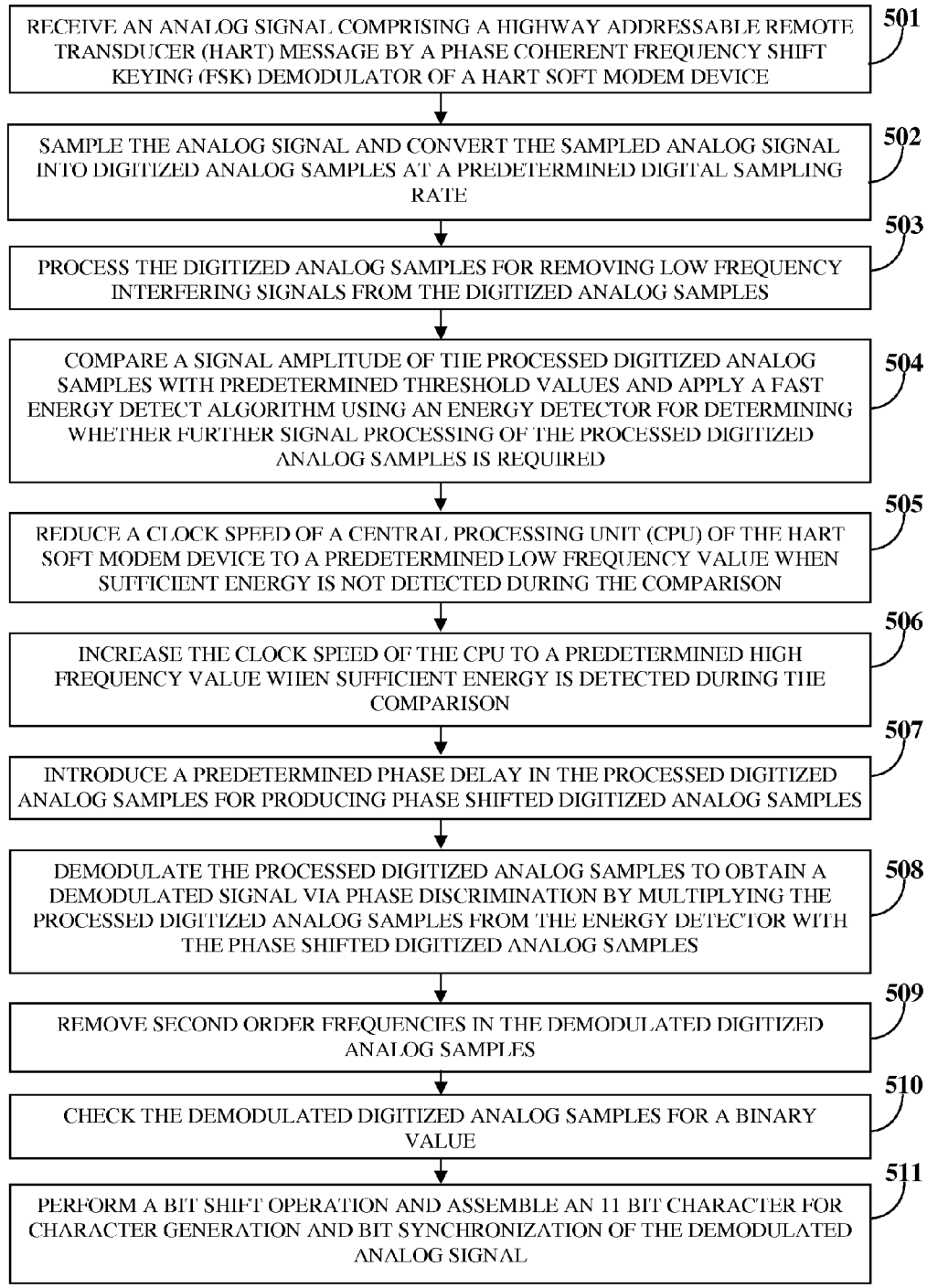
FIG. 5 illustrates a method for receiving and demodulating an analog signal comprising a Highway Addressable Remote Transducer message.

FIG. 5 illustrates a method for receiving and demodulating an analog signal comprising a Highway Addressable Remote Transducer (HART) message. The frequency shift keying (FSK) demodulator 101e of the HART soft modem device 100 exemplarily illustrated in FIG. 1 and FIG. 4, receives 501 an analog signal comprising a HART message. The FSK demodulator 101e samples 502 the analog signal and converts the sampled analog signal into digitized analog samples at a predetermined digital sampling rate. The predetermined digital sampling rate or sampling frequency is, for example, about 9600 Hz or about 19200 Hz. The FSK demodulator 101e processes 503 the digitized analog samples for removing low frequency interfering signals from the digitized analog samples. The FSK demodulator 101e compares 504 the signal amplitude of the processed digitized analog samples with predetermined threshold values and applies a fast energy detect algorithm using the energy detector 403 exemplarily illustrated in FIG. 4, for determining whether further signal processing of the processed digitized analog samples is required. The FSK demodulator 101e reduces 505 a clock speed of a central processing unit (CPU) 101b of the HART soft modem device 100 exemplarily illustrated in FIG. 1, to a predetermined low frequency value when sufficient energy is not detected in the processed digitized analog samples during the comparison. The predetermined low frequency value is, for example, 1 MHz.

The frequency shift keying (FSK) demodulator 101e increases 506 the clock speed of the central processing unit (CPU) 101b of the Highway Addressable Remote Transducer (HART) soft modem device 100 to a predetermined high frequency value, when sufficient energy is detected in the processed digitized analog samples during the comparison. The predetermined high frequency value is, for example, 4 MHz. The FSK demodulator 101e introduces 507 a predetermined phase delay in the processed digitized analog samples for producing phase shifted digitized analog samples. The HART soft modem device 100 maintains a HART communications protocol timing by using separate clocks for the CPU 101b and peripherals of the HART soft modem device 100. The FSK demodulator 101e demodulates 508 the processed digitized analog samples to obtain a demodulated analog signal via phase discrimination by multiplying the processed digitized analog samples from the energy detector 403 with the phase shifted digitized analog samples. The FSK demodulator 101e removes 509 second order frequencies in the demodulated digitized analog samples. The FSK demodulator 101e checks 510 the demodulated digitized analog samples for a binary value. A positive demodulated digitized analog sample represents a 1 and a negative demodulated digitized analog sample represents a 0. The FSK demodulator 101e performs 511 a bit shift operation and assembles an 11 bit character for character generation and bit synchronization of the demodulated analog signal. In an embodiment, the FSK demodulator 101e turns off or deactivates the CPU 101b of the HART soft modem device 100 and uses direct memory access to handle digital signal processing functions which involve repetitive multiplication and/or accumulation and data shift operations.

Figure 6:
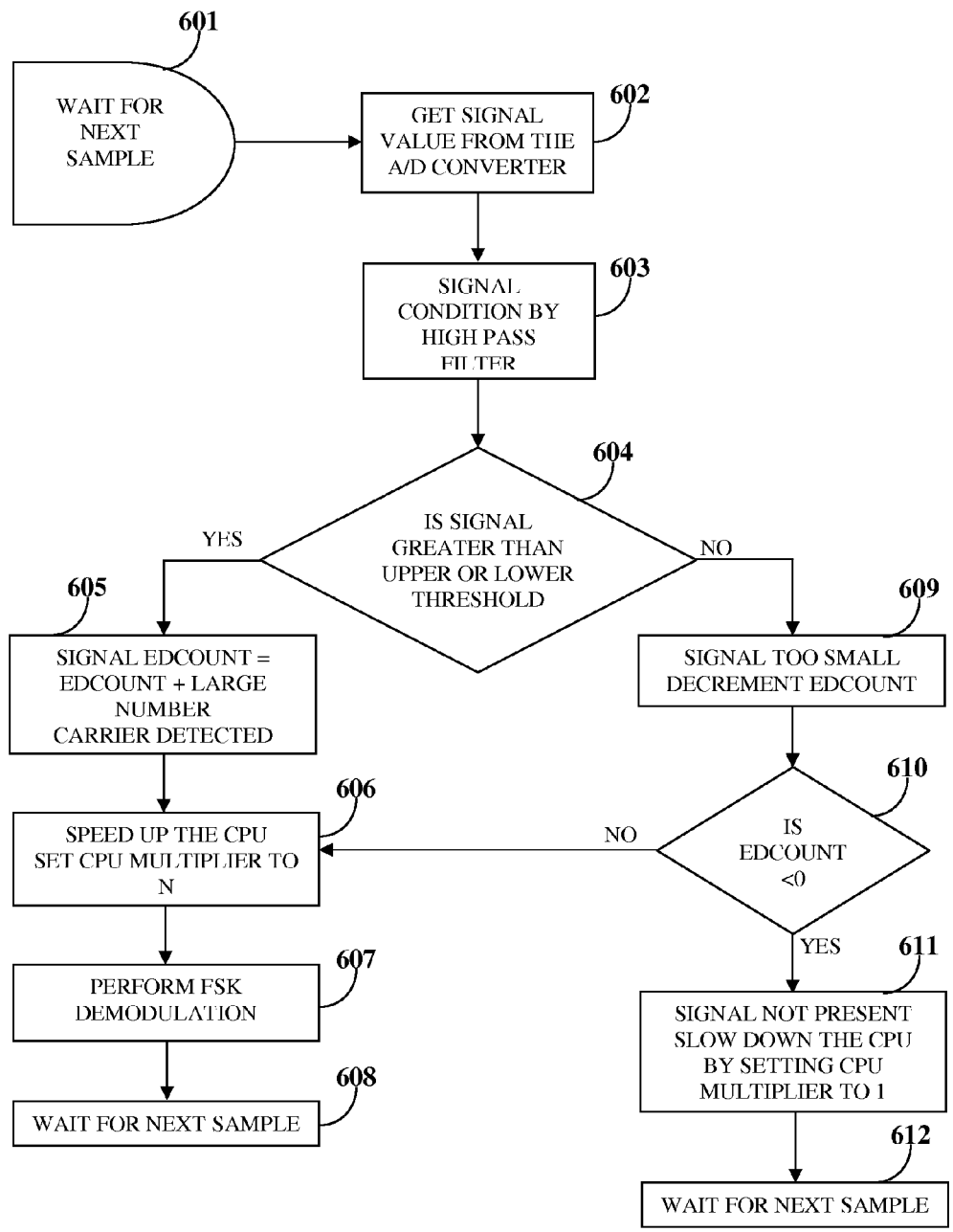
FIG. 6 illustrates a process flow diagram comprising the steps for receiving and demodulating an analog signal comprising a Highway Addressable Remote Transducer message.

FIG. 6 illustrates a process flow diagram comprising the steps for receiving and demodulating an analog signal comprising a Highway Addressable Remote Transducer (HART) message. The frequency shift keying (FSK) demodulator 101e of the HART soft modem device 100 exemplarily illustrated in FIG. 1, receives an FSK analog signal containing the HART message. The FSK demodulator 101e receives the FSK analog signal and converts the received FSK analog signal into digitized analog samples using an analog to digital (A/D) converter 401 exemplarily illustrated in FIG. 4, at a predetermined digital sampling rate. The high pass filter 402 exemplarily illustrated in FIG. 4, for example, a high pass digital finite impulse response filter of the FSK demodulator 101e waits 601 for a digitized analog sample and receives or gets 602 the signal sample value or the digitized analog samples from the A/D converter 401.

The high pass filter 402 performs signal conditioning 603 by processing the received signal sample value or digitized analog samples to remove low frequency interfering signals from the current loop signaling as required by the Highway Addressable Remote Transducer (HART) physical layer specification. The frequency shift keying (FSK) demodulator 101e checks 604 whether further signal processing is required by comparing the signal amplitude of the digitized analog samples to predetermined threshold values and applying a fast energy detect algorithm using the energy detector 403 exemplarily illustrated in FIG. 4. If the signal amplitude of the digitized analog samples is greater than the predetermined threshold values, the FSK demodulator 101e detects the presence of a valid HART analog signal and sets 605 the signal energy detect count (EDCOUNT) value to a large value. The predetermined threshold values comprise a predetermined upper threshold value and a predetermined lower threshold value. The FSK demodulator 101e speeds up 606 the central processing unit (CPU) 101b exemplarily illustrated in FIG. 1, n times and sets the CPU clock divide register. The FSK demodulator 101e performs 607 FSK demodulation through a phase discrimination method by multiplying the output of the high pass filter 402 and a 90 degree phase delayed version of the same. The FSK demodulator 101e then waits 608 for the next sample signal.

If the sample signal is too small and sufficient energy is not detected, the frequency shift keying (FSK) demodulator 101e decrements 609 the energy detect count value. If the energy detect count value is less than zero 610, the FSK demodulator 101e detects that a valid Highway Addressable Remote Transducer (HART) analog signal is not present 611 and reduces the speed of the CPU 101b by reducing the CPU frequency to a low frequency value, setting the CPU multiplier to 1, and changing the setting of the CPU 101b to a low power mode to conserve total power needed for the HART soft modem device 100. The FSK demodulator 101e then waits 612 for the next sample signal. If the energy detect count value is not less than zero, the FSK demodulator 101e speeds up 606 the CPU 101b n times and sets the CPU clock divide register and proceeds as disclosed above.

Figure 7:
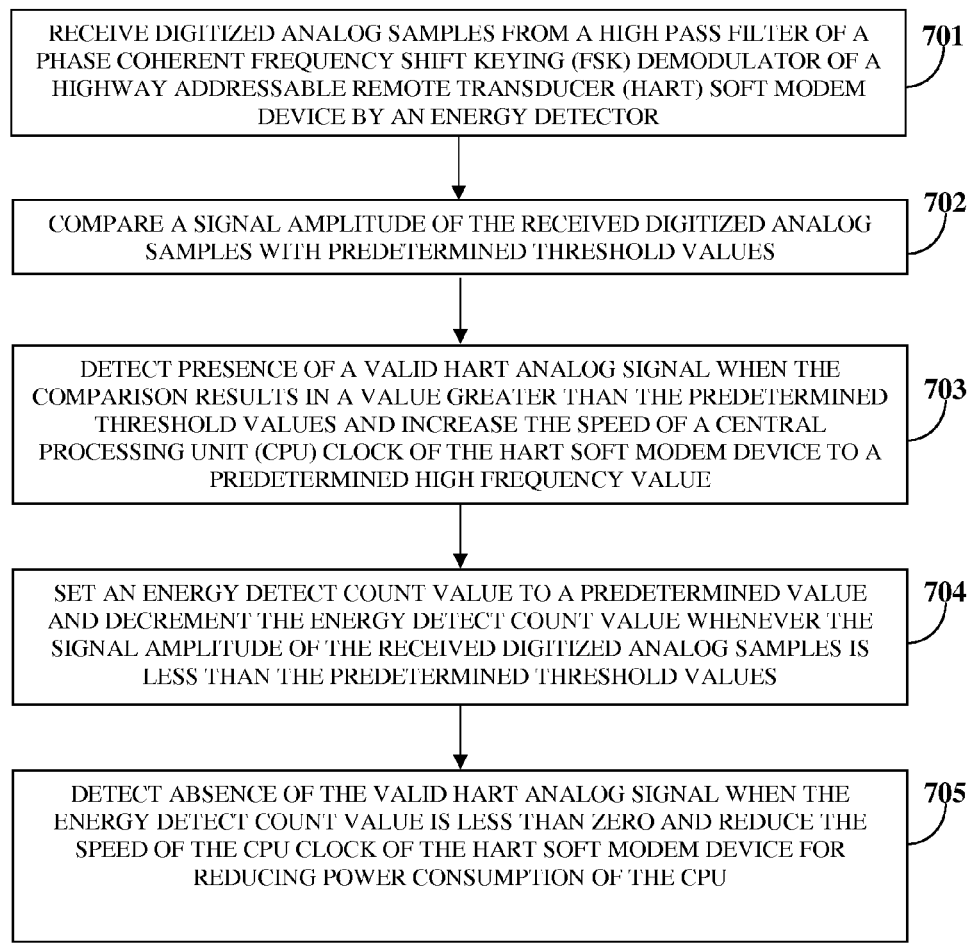
FIG. 7 illustrates a method for performing energy detection and determining speed of a central processing unit clock of the Highway Addressable Remote Transducer soft modem device.

FIG. 7 illustrates a method for performing energy detection and determining speed of a central processing unit (CPU) clock of the Highway Addressable Remote Transducer (HART) soft modem device 100 exemplarily illustrated in FIG. 1. The FSK demodulator 101e of the HART soft modem device 100 comprises the high pass filter 402 and the energy detector 403 as exemplarily illustrated in FIG. 4 and as disclosed in the detailed description of FIG. 4. The energy detector 403 receives 701 digitized analog samples from the high pass filter 402. The energy detector 403 compares 702 signal amplitude of the received digitized analog samples with predetermined threshold values. The energy detector 403 detects 703 the presence of a valid HART analog signal when the comparison results in a value greater than the predetermined threshold values. The energy detector 403 increases the speed of the CPU clock of the HART soft modem device 100 to a predetermined high frequency value. The energy detector 403 sets 704 an energy detect count value to a predetermined value and decrements the energy detect count value whenever the signal amplitude of the received digitized analog samples is less than the predetermined threshold values. The energy detector 403 detects 705 absence of the valid HART analog signal when the energy detect count value is less than zero and reduces the speed of the CPU clock of the HART soft modem device 100 for reducing the power consumption of the CPU 101b.

Figure 8:
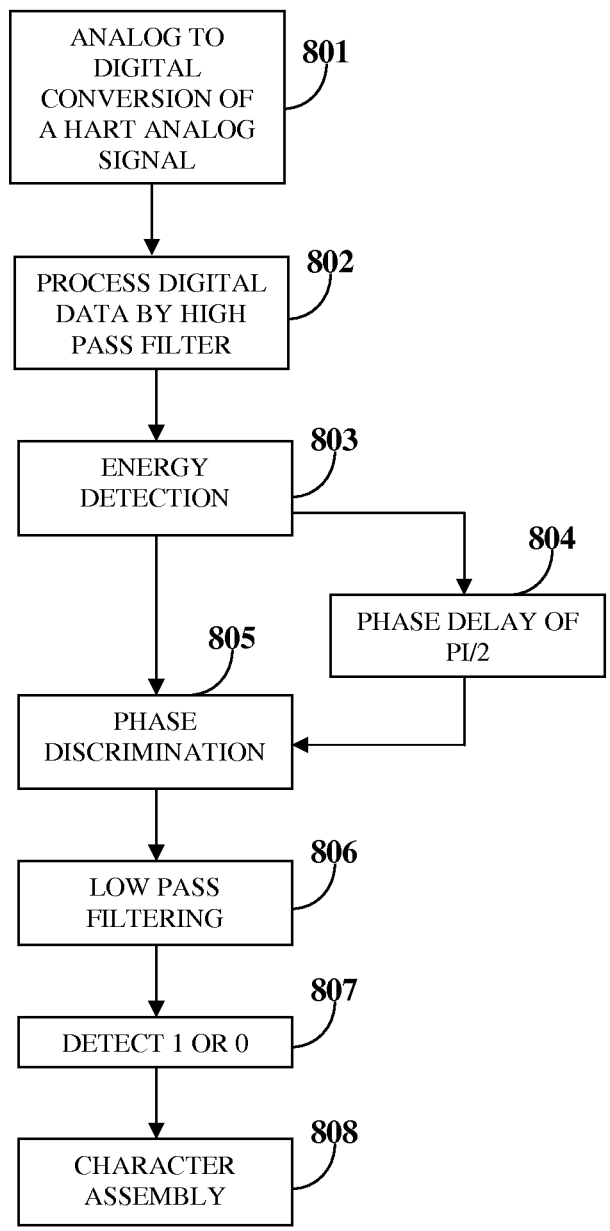
FIG. 8 illustrates a process flow diagram comprising the steps for demodulating an analog signal comprising a Highway Addressable Remote Transducer message.

FIG. 8 illustrates a process flow diagram comprising the steps for demodulating an analog signal comprising a Highway Addressable Remote Transducer (HART) message. The energy detector 403, exemplarily illustrated in FIG. 4, of the FSK demodulator 101e of the HART soft modem device 100, exemplarily illustrated in FIG. 1, performs energy detection and throttles the speed of the CPU 101b based on the detected energy value. The FSK demodulator 101e performs analog to digital conversion 801 of the HART analog signal using the analog to digital (A/D) converter 401 exemplarily illustrated in FIG. 4, and processes 802 the digitized analog samples using the high pass filter 402 exemplarily illustrated in FIG. 4. The energy detector 403 of the FSK demodulator 101e performs energy detection 803 by inspecting and comparing the output of the high pass filter 402 with predetermined upper and lower threshold values. The energy detector 403 decides that a valid HART analog signal is present when the high pass filter 402 output is greater than the predetermined threshold values.

The energy detector 403 sets a large energy detect count value which is decremented whenever the output signal of the high pass filter 402 is less than the predetermined threshold values. When this energy detect count value becomes less than zero, the energy detector 403 decides that the Highway Addressable Remote Transducer (HART) analog signal is no longer present and throttles down the central processing unit (CPU) 101b exemplarily illustrated in FIG. 1, by setting the CPU clock divider to 2, 4, 8, or n, typically 4, to slow down the CPU 101b to conserve power or lower power consumption. When sufficient energy is detected, the energy detector 403 speeds up the CPU 101b by setting the CPU clock divider to 1 to speed up the CPU 101b, so that the CPU 101b runs at the maximum speed and performs further processing of the received signal through the frequency shift keying (FSK) demodulator 101e.

While throttling the CPU clock speed for Highway Addressable Remote Transducer (HART) protocol transmission, the HART soft modem device 100 ensures that there is no timing change in the other components of the HART soft modem device 100. The HART soft modem device 100 maintains HART communications protocol timing by implementing a HART communications protocol software and by using separate clocks for peripherals and the CPU 101b so that when the CPU clock divider is set to 2, 4, 8, etc., typically, 4, to slow down the CPU 101b to conserve power, the system software timer which typically runs off the hardware based timers are not affected by the CPU clock changes. For example, in an implementation of the HART soft modem device 100 based on Texas Instruments MSP430 family of microprocessors, the master clock (MCLK) is used by the CPU 101b whereas the peripherals such as the timer, analog to digital converters, etc., use the auxiliary clock (ACLK). This method reduces the complexity of the HART communications protocol software by not affecting HART communications protocol timers.

The frequency shift keying (FSK) demodulator 101e performs FSK demodulation through a phase discrimination method 805 by multiplying the output of the high pass filter 402 and 90 degree phase delayed version 804 of the same. The FSK demodulator 101e applies 806 a low pass filter 406 exemplarily illustrated in FIG. 4, to the digitized analog samples to remove the second order frequencies at 2Wc. The FSK demodulator 101e then detects 807 whether a 1 or 0 was received by looking at the output of the low pass filter 406, where a positive number represents 1 and a negative number represents 0. The FSK demodulator 101e further shifts these bits through a software based shift register and assembles an 11 bit character 808 with 1 start, 8 data, 1 parity, and 1 stop bit as specified in the Highway Addressable Remote Transducer (HART) protocol standards.

Figure 9:
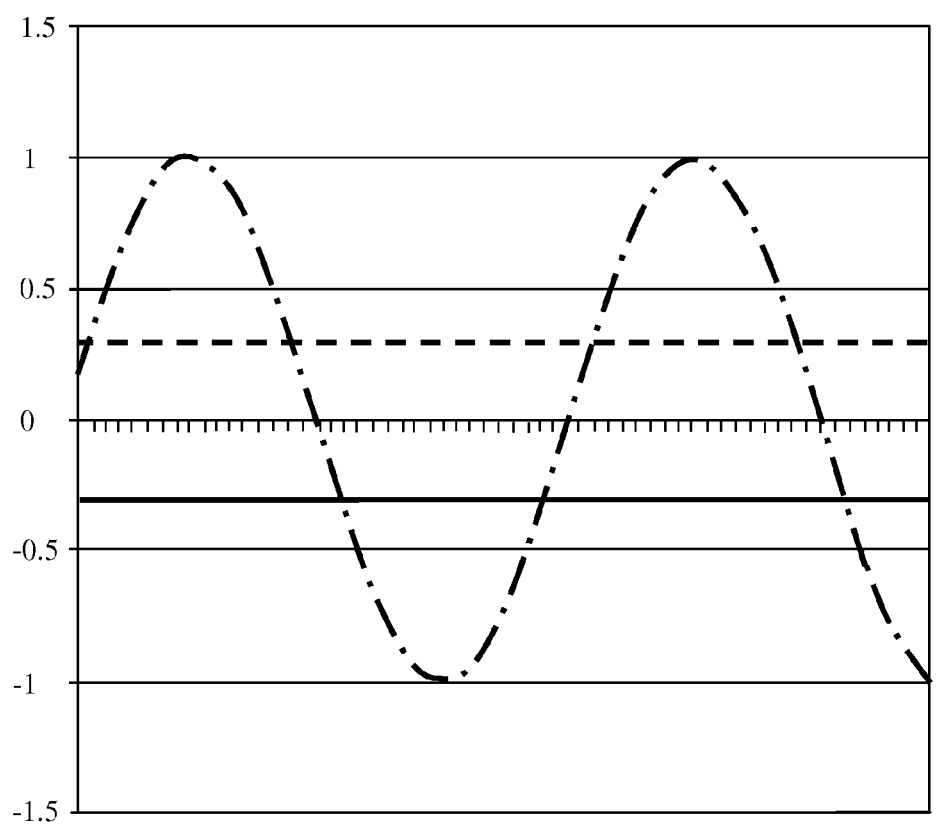
FIG. 9 exemplarily illustrates a graphical representation of a relationship between a transmitted signal and threshold values of the Highway Addressable Remote Transducer soft modem device.

FIG. 9 exemplarily illustrates a graphical representation of a relationship between a transmitted signal and threshold values of a Highway Addressable Remote Transducer (HART) soft modem device 100 exemplarily illustrated in FIG. 1. The HART soft modem device 100 disclosed herein provides a more accurate modulation, transmission, and demodulation of the analog signals using digital signal processing algorithms. Since these methods are computationally more intensive, distinctive algorithms are utilized for energy detection and for speed throttling of the central processing unit (CPU) 101b of the microcontroller 101 exemplarily illustrated in FIG. 1, to ensure that the speed of the CPU 101b is increased only when needed. Since the duty cycle, that is, the communication on-time versus off-time of a typical HART communication is less than 50%, the methods disclosed herein result in lowering of the total power consumption of the HART soft modem device 100 by about 50%.

The Highway Addressable Remote Transducer (HART) soft modem device 100 disclosed herein utilizes an up down counter method. In this method, if the analog signal amplitude is above the predetermined threshold values, a large up count value is added, and whenever the analog signal is within the threshold values a much smaller down count value is subtracted. This method facilitates fast energy detection and a slower detection of energy decay. The carrier detect or energy detector 403 exemplarily illustrated in FIG. 4, responds within 2 sine wave cycles, which is, for example, about 1.66 ms in the HART soft modem device 100. The relationship between the analog signal and the threshold values relative to each other is exemplarily illustrated in FIG. 9. The exact values of the signal and threshold values can vary depending on each configuration of the HART soft modem device 100 and configuration parameters.

A pseudocode and the values chosen in an embodiment of the Highway Addressable Remote Transducer (HART) soft modem device 100 is shown below:

if((fsksignal)>upperthreshold||
(fsksignal<lowerthreshold))
 {energydetectcount+=largecount;
  If(energydetectcount>somecount)carrierdetect=1;
 }
 else edcount--;
 if(edcount<0){
 edcount=-1;carrierdetect=0;
 goto enddemod; //no carrier present. Exit demod routine
 }

The central processing unit (CPU) 101b of the microcontroller 101 requires a frequency cycle of about 1 MHz or less in order to perform analog signal sampling and energy detection. Hence, the Highway Addressable Remote Transducer (HART) soft modem device 100 runs as a default at 1 MHz. Once the energy detect threshold is reached, indicating that a carrier signal is present, the speed of a master clock of the CPU 101b is increased to initiate the rest of the processing of the FSK demodulator 101e exemplarily illustrated in FIG. 1 and FIG. 4, so that a transmitted message can be decoded. For example, in the HART soft modem device 100 implemented using MSP430, the speed of the CPU master clock (MCLK) is increased from 1 MHz to 4 MHz which is sufficient processing power for operating the FSK demodulator 101e. Since the duty cycle of the HART receiver or control device is less than 50%, this method results in 50% power reduction. The pseudocode showing energy detection and CPU clock multiplier setting is shown below:

if ((fsksignal)>upperthreshold||
(fsksignal<lowerthreshold))
 {energydetectcount+=largecount;carrierdetect=1;
  //Carrier is detected, speed up the CPU
 UCSCTL5 &=!(DIVM2); //set CPU clock divider to 1. Speed up the CPU.
 }
 else edcount--;
 if(edcount<0){
 edcount=-1;carrierdetect=0;
 UCSCTL5|=DIVM2; //No signal, set CPU clock divider to 4.
 Slow down the CPU
 goto enddemod; //no carrier present. Exit demod routine
 }

Figure 10:
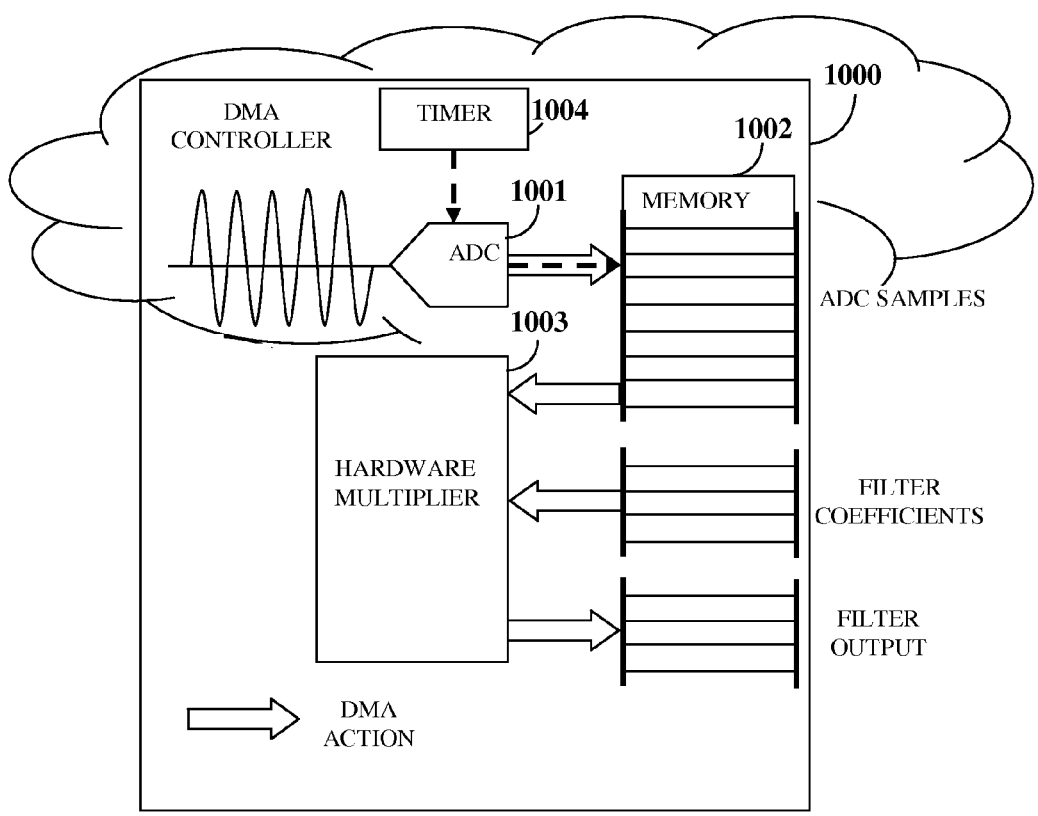
FIG. 10 exemplarily illustrates a flow diagram showing a method for reducing operating power using a direct memory access controller of the Highway Addressable Remote Transducer soft modem device.

FIG. 10 exemplarily illustrates a flow diagram showing a method for reducing operating power using a direct memory access (DMA) controller 1000 of the Highway Addressable Remote Transducer (HART) soft modem device 100 exemplarily illustrated in FIG. 1. The HART soft modem device 100 comprises a DMA controller 1000 configured to reduce power consumption of the HART soft modem device 100. In the HART soft modem device 100 disclosed herein, the central processing unit (CPU) 101b of the microcontroller 101 exemplarily illustrated in FIG. 1, processes the analog signal only about every 0.5 ms. The longer the CPU 101b remains in low power mode, the lower the total power consumption. The processing of the received analog signal and application of linear multiply algorithms is streamlined with a sequence of DMA operations. The DMA controller 1000 disclosed herein comprises an analog to digital converter (ADC) 1001, a memory unit 1002, a hardware multiplier 1003, and a timer 1004. The DMA operations comprise converting the analog signal to digitized analog samples using the ADC 1001 and storing the digitized analog samples in the memory unit 1002, followed by transferring the digitized analog samples from the memory unit 1002 to the hardware multiplier 1003 and back to the memory unit 1002, followed by a memory-to-memory data move. This pipelining of the DMA process minimizes the need for CPU operation and thus lowers power consumption by the CPU 101b.

The analog to digital conversion operation of the analog to digital converter (ADC) 1001 is triggered by the timer 1004 since the conversion is performed periodically at about 9600 times a second. The converted analog sample is directly sent to the memory unit 1002. Subsequent multiplication and/or accumulation between the digitized analog samples and the filter coefficients of the low pass filter 406 exemplarily illustrated in FIG. 4, and/or data shift operations required by the frequency shift keying (FSK) demodulator 101e exemplarily illustrated in FIG. 1 and FIG. 4, are sequenced in the direct memory access (DMA) controller 1000 using DMA sequences. The filter coefficients and the digitized analog samples become the two inputs to the hardware multiplier 1003 and the output of the hardware multiplier 1003 becomes the low pass filter output. The CPU intervention is only required for the final decision and the character assembly process. The DMA sequences are exemplarily illustrated in FIG. 10. This DMA process results in a significant reduction in CPU utilization and thus makes the Highway Addressable Remote Transducer (HART) soft modem device 100 more effective.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:
1. A method for receiving and demodulating an analog signal comprising a highway addressable remote transducer message, said method comprising:

receiving said analog signal comprising said highway addressable remote transducer message by a phase coherent frequency shift keying demodulator of a highway addressable remote transducer soft modem device;

sampling said analog signal and converting said analog signal into digitized analog samples by said phase coherent frequency shift keying demodulator at a predetermined digital sampling rate;

processing said digitized analog samples by said phase coherent frequency shift keying demodulator for removing low frequency interfering signals from said digitized analog samples;

comparing a signal amplitude of said processed digitized analog samples with predetermined threshold values and applying a fast energy detect algorithm using an energy detector, by said phase coherent frequency shift keying demodulator for determining whether further signal processing of said processed digitized analog samples is required;

reducing a clock speed of a central processing unit of said highway addressable remote transducer soft modem device to a predetermined low frequency value by said phase coherent frequency shift keying demodulator, when sufficient energy is not detected in said processed digitized analog samples during said comparison;

increasing said clock speed of said central processing unit of said highway addressable remote transducer soft modem device to a predetermined high frequency value by said phase coherent frequency shift keying demodulator, when sufficient energy is detected in said processed digitized analog samples during said comparison;

introducing a predetermined phase delay in said processed digitized analog samples by said phase coherent frequency shift keying demodulator for producing phase shifted digitized analog samples;

demodulating said processed digitized analog samples to obtain a demodulated analog signal, by said phase coherent frequency shift keying demodulator, via phase discrimination by multiplying said processed digitized analog samples from said energy detector with said phase shifted digitized analog samples;

removing second order frequencies in said demodulated digitized analog samples, by said phase coherent frequency shift keying demodulator;

checking said demodulated digitized analog samples for a binary value, by said phase coherent frequency shift keying demodulator, wherein a positive demodulated digitized analog sample represents a 1 and a negative demodulated digitized analog sample represents a 0; and performing a bit shift operation and assembling an 11 bit character, by said phase coherent frequency shift keying demodulator, for character generation and bit synchronization of said demodulated analog signal.

2. The method of claim 1, wherein said predetermined low frequency value is 1 MHz and said predetermined high frequency value is 4 MHz.

3. The method of claim 1, further comprising deactivating said central processing unit of said highway addressable remote transducer soft modem device and using direct memory access by said phase coherent frequency shift keying demodulator to handle processes other than said demodulation of said analog signal.

4. The method of claim 1, wherein said predetermined digital sampling rate is one of 9600 Hz and 19200 Hz.

5. The method of claim 1, further comprising maintaining a protocol timing of said highway addressable remote transducer soft modem device by using separate clocks for said central processing unit and peripherals of said highway addressable remote transducer soft modem device.

\* \* \* \* \*